(12) United States Patent
Ulloa et al.

(10) Patent No.: US 10,165,875 B2
(45) Date of Patent: Jan. 1, 2019

(54) PICTURE HANGING MARKING TOOL

(71) Applicant: MAGNUS INVENTIONS LLC, Dallas, TX (US)

(72) Inventors: Armando Ulloa, Dallas, TX (US); Alfredo Ulloa, Dallas, TX (US)

( * ) Notice: Subject to any disclaimer, the term of this patent is extended or adjusted under 35 U.S.C. 154(b) by 126 days.

(21) Appl. No.: 15/444,044

(22) Filed: Feb. 27, 2017

(65) Prior Publication Data
US 2017/0303709 A1     Oct. 26, 2017

Related U.S. Application Data

(60) Provisional application No. 62/391,292, filed on Apr. 26, 2016.

(51) Int. Cl.
| | |
|---|---|
| *A47G 1/16* | (2006.01) |
| *A47G 1/24* | (2006.01) |
| *B25H 7/04* | (2006.01) |
| *G01C 9/02* | (2006.01) |

(52) U.S. Cl.
CPC ............... *A47G 1/24* (2013.01); *B25H 7/04* (2013.01); *G01C 9/02* (2013.01)

(58) Field of Classification Search
CPC ....................................................... A47G 1/16
USPC ........................... 33/574, 576, 577, 578, 579
See application file for complete search history.

(56) References Cited

U.S. PATENT DOCUMENTS

| | | | | |
|---|---|---|---|---|
| 3,530,591 | A * | 9/1970 | Moffitt | A47G 1/20 248/544 |
| 5,103,573 | A * | 4/1992 | Ehling | G01C 9/34 33/379 |
| 5,560,116 | A | 10/1996 | Tobia | |
| 6,049,991 | A | 4/2000 | Gruenberg et al. | |
| 6,473,983 | B1 * | 11/2002 | Gier | A47G 1/205 33/613 |
| 6,784,977 | B2 | 8/2004 | von Bunau et al. | |
| 6,898,862 | B1 * | 5/2005 | Oberst | A47G 1/205 33/574 |
| 7,298,964 | B2 | 11/2007 | Savagian et al. | |
| 7,316,078 | B2 * | 1/2008 | Hagman | A47G 1/205 248/544 |
| D611,367 | S | 3/2010 | Wu | |
| 8,061,054 | B2 | 11/2011 | Rabin | |
| 8,261,462 | B2 | 9/2012 | Coyle | |
| 8,397,392 | B2 | 3/2013 | Fuchs | |
| D694,135 | S | 11/2013 | Kershaw | |
| 8,739,423 | B1 | 6/2014 | Cortum et al. | |
| D803,076 | S * | 11/2017 | Ulloa | A47G 1/16 D10/69 |
| 2002/0078583 | A1 * | 6/2002 | Richardson | A47G 1/205 33/613 |
| 2002/0095812 | A1 | 7/2002 | Newman | |
| 2004/0049936 | A1 * | 3/2004 | Newman | B25H 7/04 33/613 |

(Continued)

FOREIGN PATENT DOCUMENTS

EP     2056065 B1     10/2008

*Primary Examiner* — G. Bradley Bennett

(74) *Attorney, Agent, or Firm* — Edwin S. Flores; Chalker Flores, LLP

(57) ABSTRACT

The present invention includes methods, devices, kits, and components of an apparatus that can assist a user to identify locations of attachment points or openings on a frame and transferring those measurements to a wall for purposes of supporting a picture that is level.

26 Claims, 6 Drawing Sheets

(56) References Cited

U.S. PATENT DOCUMENTS

| | | | | |
|---|---|---|---|---|
| 2004/0098875 A1* | 5/2004 | Gould | ............... | A47G 1/205 33/613 |
| 2009/0313843 A1* | 12/2009 | Compton | ............... | A47G 1/205 33/613 |
| 2017/0055732 A1* | 3/2017 | Krake | ............... | A47G 1/205 |
| 2018/0023939 A1* | 1/2018 | Hicks | ............... | B23P 19/10 33/645 |

* cited by examiner

PICTURE HANGING MARKING TOOL

CROSS-REFERENCE TO RELATED APPLICATIONS

This application claims priority to U.S. Provisional Application Ser. No. 62/391,292, filed Apr. 26, 2016, the entire contents of which is incorporated herein by reference.

TECHNICAL FIELD OF THE INVENTION

The present invention relates in general to the field of hanging items on a surface, and more particularly, to picture hanging aids and position marking tools.

STATEMENT OF FEDERALLY FUNDED RESEARCH

None.

INCORPORATION-BY-REFERENCE OF MATERIALS FILED ON COMPACT DISC

None.

BACKGROUND OF THE INVENTION

Without limiting the scope of the invention, its background is described in connection with picture hanging aids and position marking tools.

There are various aids available; however, all are limited in one respect or another and thus, have several drawbacks. For example, many devices are cumbersome to use and expensive to manufacture, use special hardware, can only be used from a position above and in front of the picture, or merely assists a user in aligning two adjacent points to the same horizontal level. Another drawback is the inability to measure and mark frames that have 2 attachment points.

For example, U.S. Pat. No. 6,049,991, discloses a picture hanging position marking tool is disclosed having a relatively flat, elongated support arm is a marking orifice at the distal end opposite a support arm handle. The marking orifice is bounded at its lower edge by a support cam, pivotally affixed to one side of the support arm. The support cam is comprised at its upper edge of a first hanger support ridge formed parallel to a second hanger support ridge. The two hanger support ridges bound a marking cavity between. Measuring indicia are provided along the length of the support arm, and a bubble level is located horizontally within the handle.

As a result there exists a long felt need for an apparatus that can assist a user in measuring the location of securement rings on a frame and transferring and aligning those measurements to a wall for purposes of supporting a picture.

SUMMARY OF THE INVENTION

In one embodiment the present invention includes a mounting hole transfer device comprising: a support member; and one or more marker housings slidably positioned on the support member, wherein the one or more marker housings are capable of being lockably positioned at any point along the support member and comprise an opening to transfer an indicia onto a surface, and at least one horizontal level on at least one of the support member or the one or more marker housings to leveling the mounting hole transfer device. In one aspect, the support member comprises a profile comprising a square profile, a member having a rectangular profile, a member having a circular profile, a member having a polygonal profile, a member having a triangular profile, or a member having an "L"-shaped profile. In another aspect, at least one of the support member or the one or more marker housings comprises metal (aluminum, steel, alloys), wood, plastic, polymer, composite, ceramic, fiberglass, or combinations thereof. In another aspect, the support member comprises one or more indicia or indentations comprising one or more units of measure, which units may begin at first end, at a center-point, a second end, the indicia may increase numerically from right to left, the indicia may increase from left to right, the indicia may increase from the center outward, or have an intermediate starting point.

In another embodiment the present invention includes a method of mounting a frame on a wall comprising the steps of: aligning one or more mounting points of one or more marker housings slidably positioned on a support member, wherein the one or more marker housings are capable of being lockably positioned at any point along the support member and on a mounting position of a frame, wherein each of the one or more marker housings comprising one or more levels; locking the one or more marker housings on the support member; positioning the mounting hole transfer device on the wall; leveling the support member and the one or more marker housings on the wall; and marking a surface of the wall with a marker.

The present invention also provides a mounting hole transfer device comprising: a support member; a first marker housing slidably positioned on the support member, wherein the first marker housing is capable of being lockably positioned at any point along the support member, a first thumb screw connected to the first marker housing to lock the first marker housing at a first position along the support member, a first retractable pin positioned in the first marker housing, wherein the first retractable pin extends and retracts from the first marker housing to mark a first position on a surface, and a first rotatable knob attached to the first marker housing and connected to the first retractable pin, wherein the rotation of the first rotatable knob extends and retracts the first retractable pin from the first marker housing; a second marker housing slidably positioned on the support member, wherein the second marker housing is capable of being lockably positioned at any point along the support member, a second thumb screw connected to the second marker housing to lock the second marker housing at a second position along the support member, a second retractable pin positioned in the second marker housing, wherein the second retractable pin extends and retracts from the second marker housing to mark a second position on the surface, and a second rotatable knob attached to the second marker housing and connected to the second retractable pin, wherein the rotation of the second rotatable knob extends and retracts the second retractable pin from the second marker housing; a vertical level positioned on the first marker housing, second marker housing or the support member to vertically align the support member; and a horizontal level positioned on the first marker housing, second marker housing or the support member to horizontally align the support member.

The present invention provides a mounting hole transfer device kit comprising an instruction set to aid in assembly; a support member; a first marker housing capable of being slidably positioned on the support member, wherein the first marker housing is capable of being positioned at any point along the support member, a first locking device connected to the first marker housing to restrict the movement of the first marker housing along the support member, a first retractable pin positioned in the first marker housing, wherein the first retractable pin extends and retracts from the first marker housing, and a first pin actuator positioned in the first marker housing and contacting the first retractable pin to extend and retract the first retractable pin from the first marker housing; a second marker housing capable of being slidably positioned on the support member, wherein the second marker housing is capable of being positioned at any point along the support member, a second locking device connected to the second marker housing to restrict the movement of the second marker housing along the support member, a second retractable pin positioned in the second marker housing, wherein the second retractable pin extends and retracts from the second marker housing, and a second pin actuator positioned in the second marker housing and contacting the second retractable pin to extend and retract the second retractable pin from the second marker housing; a vertical level positioned on the first marker housing, second marker housing or the support member to vertically align the support member; and a horizontal level positioned on the first marker housing, second marker housing or the support member to horizontally align the support member.

The present invention provides a frame hanging marker housing comprising: a marker housing capable of being slidably positioned on a support member, wherein the marker housing is capable of being lockably positioned at any point along the support member, a thumb screw connected to the marker housing to lock the marker housing at a position along the support member, a marking aperture positioned in the marker housing, wherein the marking aperture extends to mark a position on a surface, and a vertical level positioned on the marker housing, a horizontal level positioned on the marker housing or both.

In another embodiment the present invention includes a mounting hole transfer device kit comprising: an instruction set to aid in assembly; one or more marker housings capable of being slidably positioned on a support member, wherein the first marker housing is capable of being positioned at any point along the support member, and comprising: a first locking device connected to the first marker housing to restrict the movement of the first marker housing along the support member; a first retractable pin positioned in the first marker housing, wherein the first retractable pin extends and retracts from the first marker housing; a first pin actuator positioned in the first marker housing and contacting the first retractable pin to extend and retract the first retractable pin from the first marker housing or alternatively removing the first retractable pin to provide an opening for a marker; and a horizontal level positioned on the one or more marker housings to horizontally align the support member; and optionally a vertical level positioned on the one or more marker housings to vertically align the support member.

In another embodiment the present invention includes a frame hanging marker housing comprising: a marker housing capable of being slidably positioned on a support member, wherein the marker housing is capable of being lockably positioned at any point along the support member; a marking aperture positioned in the marker housing, wherein the marking aperture extends to mark a position on a surface, and an optional vertical level positioned on the marker housing, a horizontal level positioned on the marker housing or both.

The present invention also provides a method of mounting a frame on a wall comprising the steps of: providing a frame having a first mounting point and a second mounting point; providing a mounting hole transfer device comprising: a support member; a first marker housing slidably positioned on the support member, wherein the first marker housing is capable of being lockably positioned at any point along the support member, a first thumb screw connected to the first marker housing to lock the first marker housing at a first position along the support member, a first retractable pin positioned in the first marker housing, wherein the first retractable pin extends and retracts from the first marker housing to mark a first position on a wall, and a first rotatable knob attached to the first marker housing and connected to the first retractable pin, wherein the rotation of the first rotatable knob extends and retracts the first retractable pin from the first marker housing; a second marker housing slidably positioned on the support member, wherein the second marker housing is capable of being lockably positioned at any point along the support member, a second thumb screw connected to the second marker housing to lock the second marker housing at a second position along the support member, a second retractable pin positioned in the second marker housing, wherein the second retractable pin extends and retracts from the second marker housing to mark a second position on the wall, and a second rotatable knob attached to the second marker housing and connected to the second retractable pin, wherein the rotation of the second rotatable knob extends and retracts the second retractable pin from the second marker housing; a vertical level positioned on the first marker housing, second marker housing or the support member to vertically align the support member; and a horizontal level positioned on the first marker housing, second marker housing or the support member to horizontally align the support member; positioning the mounting hole transfer device on the frame; aligning the first mounting point with the first retractable pin; tightening the first thumb screw to lock the first marker housing on the support member; positioning the second marker housing on the support member to align the second retractable pin with the second mounting point; tightening the second thumb screw to lock the second marker housing on the support member; removing the mounting hole transfer device; positioning the mounting hole transfer device on the wall; aligning the horizontal level to horizontally align the support member on the wall; aligning the horizontal level to vertically align the support member on the wall; turning the first rotatable knob to extend the first retractable pin from the first marker housing into the wall to form a first mounting mark or removing the first mounting point to provide an opening for a marker; turning the second rotatable knob to extend the second retractable pin from the second marker housing into the wall to form a second mounting mark or removing the first mounting point to provide an opening for a marker; removing the mounting hole transfer device from the wall; inserting a first fastener into the wall at the first mounting mark; insert a second fastener into the wall at the second mounting mark; positioning the frame to align the first mounting point with the first fastener; and positioning the frame to align the second mounting point with the second fastener.

The present invention provides a mounting hole transfer device comprising a support member; a first marker housing slidably positioned on the support member, wherein the first marker housing is capable of being positioned at any point along the support member, a first locking device connected to the first marker housing to restrict the movement of the first marker housing along the support member, a first retractable pin positioned in the first marker housing, wherein the first retractable pin extends and retracts from the first marker housing, and a first pin actuator positioned in the first marker housing and contacting the first retractable pin to extend and retract the first retractable pin from the first marker housing; a second marker housing slidably positioned on the support member, wherein the second marker housing is capable of being positioned at any point along the support member, a second locking device connected to the second marker housing to restrict the movement of the second marker housing along the support member, a second retractable pin positioned in the second marker housing, wherein the second retractable pin extends and retracts from the second marker housing, and a second pin actuator positioned in the second marker housing and contacting the second retractable pin to extend and retract the second retractable pin from the second marker housing; a vertical level positioned on the first marker housing, second marker housing or the support member to vertically align the support member; and a horizontal level positioned on the first marker housing, second marker housing or the support member to horizontally align the support member.

The support member may have a profile comprising a square profile, a member having a rectangular profile, a member having a circular profile, a member having a profile, a member having a triangular profile, a member having a "L shaped profile. The first retractable pin, the second retractable pin, or both may have a metal rod, a pin, a pencil, a nail or any mechanism that is capable of marking on a surface. The first retractable pin, the second retractable pin, or both may be replaceable. The vertical level, horizontal level, or both are a bubble, a bull's eye, a laser, a plumb-bob, or a spirit level. The support member may have a profile comprising a square profile, a member having a rectangular profile, a member having a circular profile, a member having a profile, a member having a triangular profile, a member having a "L shaped profile. The first locking device, the second locking device, or both comprises a thumb screw that tightens a tab against the support member. The first locking device, the second locking device, or both may have a vice like mechanism that tightens the first locking device to the support member. The first locking device, the second locking device, or both may have a first knob that tightens a tab against the support member. The first locking device, the second locking device, or both comprises a first lever that tightens a tab against the support member. The first retractable pin, the second retractable pin, or both comprise a metal rod, a pin, a pencil, a nail or any mechanism that is capable of marking on a surface. The first retractable pin, the second retractable pin, or both may be replaceable. The first pin actuator, the second actuator, or both may be a plunger that presses the first retractable pin, the second retractable pin, or both into the surface. The first pin actuator, the second actuator, or both comprise a knob that turns the first retractable pin, the second retractable pin, or both into the surface. The first pin actuator, the second actuator, or both comprise a tab that presses the first retractable pin, the second retractable pin, or both into the surface. The vertical level, horizontal level, or both may be bubble levels.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
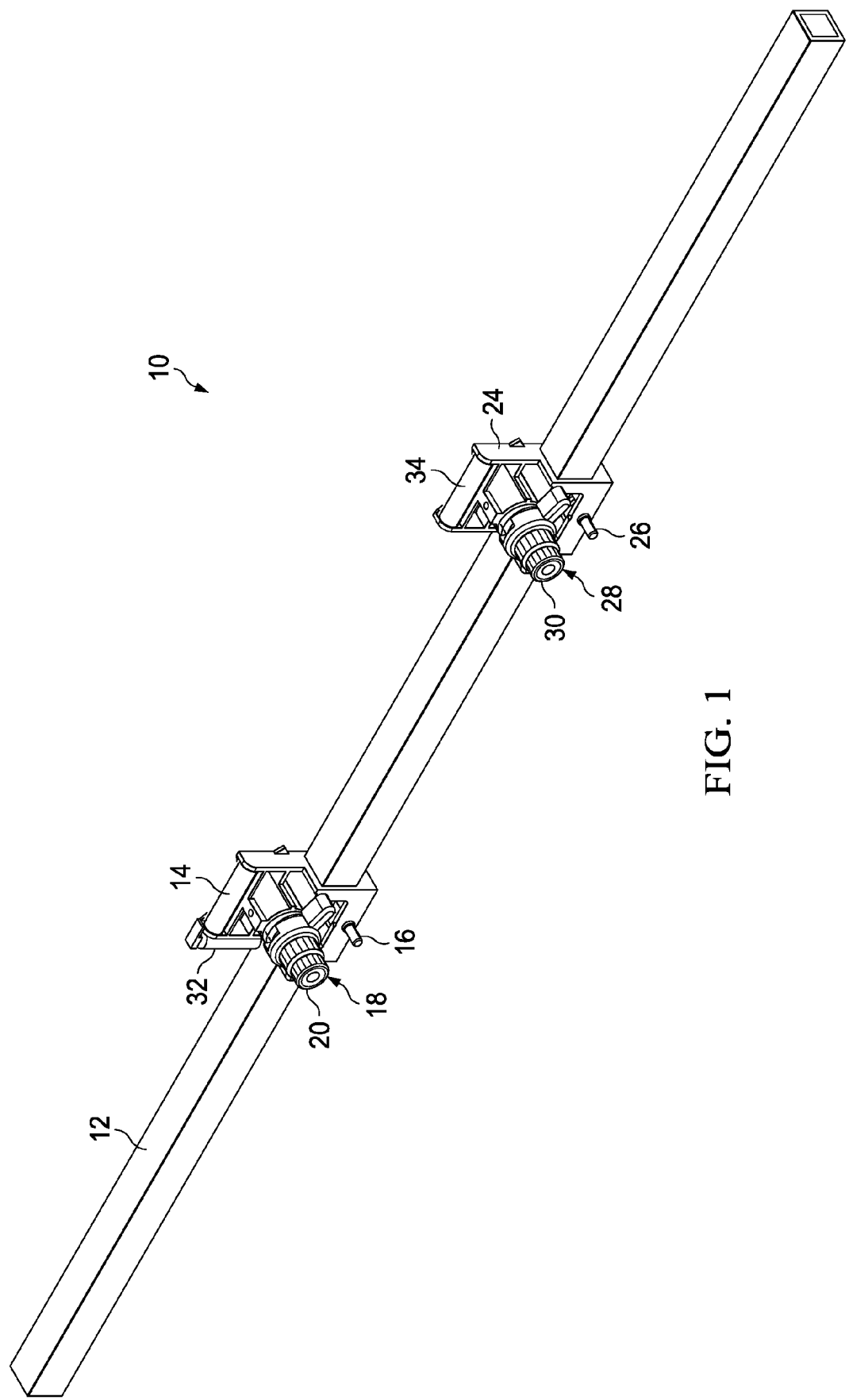
FIG. 1 is an isometric view of one embodiment of the picture hanging marking tool.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein, the term "support member" denotes any type of support on which the marker housing can be slibable and/or lockable and may have any length, with certain standard lengths being preferred, such as 12 inches (approx. 30 centimeters), 18 inches (approx. 45 centimeters), 24 inches (approx. 60 centimeters), 36 inches (approx. 90 centimeters), 48 inches (approx. 120 centimeters), or 5, 6, 7, 8 or more feet, or 30, 50, 75 centimeters, a meter, or more than a meter, such as 1.5 and 2.0 or more meters. The support member may be a bar, ruler, tube and have any cross-sectional shape such as rectangular, square, round, tubular, oval, or polygonal any may further include any number of well-known indicia, such as centimeters, inches, feet, meters, and subparts thereof (e.g., millimeters, fractions, etc.), and may even include one or more units for measuring length on the same or separate surfaces of the support member. The units may begin at one end, or may be provided with a center-point, such that the indicia increase numerically from right to left, from left to right, from the center outward, or vice-versa, or another starting point. The support member may also include a level, which level can includes at least one of a horizontal, a vertical, a diagonal, or a adjustable level (which could also include indicia with regard to an angle or angles). The support member may be, e.g., metal (aluminum, steel, alloys), wood, plastic, polymer, composite, fiberglass, or combinations thereof, such as a carpenter's ruler. The support member or even the marker housing taught herein can include a square, a combination square, a protractor or other device that permits the transfer of an angle.

As used herein, the term "surface" denotes any surface and can be used interchangeably with the term wall, and includes, but is not limited to: sheet rock, metal, brick, stone, concrete, grout, wood, post, fence, board, fabric, plastic, paper, glass, polymer, fiberglass, ceramic, tile, fiberglass, sheet metal, or any other material. In addition the surface may be smooth, textured, grooved, rough, uneven, or a combination thereof, or may be difficult to dent, indent, cut or (e.g., steel), or may be a surface that should not be cut, dented, or scratched (e.g., glass).

As used herein, the term "marker" denotes any device that transfers ink or other indicia onto a surface, which can include but are not limited to pencils, ink pens, paint pens, markers, felt-tip markers, semi-permanent or permanent markers and inks, ballpoint pens, gel pens, brush-tip pens, ceramic pens, ultra-fin, fine, medium, super, large or extra large, chisel or other marker surfaces, crayons, pastel pens or sticks, wax, wax sticks, wax pens, highlighter, laser, electronic, etching, invisible ink, etc. that can be inserted into the opening of the marker housings. In the case of markers that deposit an ink or paint, any of a variety of chemistries can be used, such as temporary, permanent, security, highlighter, and can mark with any color or combinations of colors or shapes.

The present invention may be made from a wide variety of materials. The various components, such as the support member, the marker housings, the pins or makers, and any parts thereof can be unitary or made from various parts and can be made from any material, including, but not limited to: plastic, polymer, wood, metal, ceramic, glass, composites, fiberglass, or combinations thereof, and the marker housings and any parts thereof can be made by, e.g., injection molding, milling, stamping, or even 3-D printed.

FIG. 1 is an isometric view of one embodiment of the picture hanging marking tool 10 designed to fit a frame (not shown) having 2 attachment points in the attachment surface. The picture hanging marking tool 10 includes a support member 12. A first marker housing 14 slidably positioned on the support member 12, wherein the first marker housing 14 is capable of being lockably positioned at any point along the support member 12. The first marker housing 14 includes a first thumb screw 16 connected to the first marker housing 14 to lock the first marker housing 14 at a first position along the support member 12. The first marker housing 14 includes a first retractable pin 18 positioned in the first marker housing 14, wherein the first retractable pin 18 extends and retracts from the first marker housing 14 to mark a first position on a surface. The first marker housing 14 includes a first rotatable knob 20 attached to the first marker housing 14 and connected to the first retractable pin 18, wherein the rotation of the first rotatable knob 20 extends and retracts the first retractable pin 18 from the first marker housing 14. The hanging marking tool 10 includes a second marker housing 24 slidably positioned on the support member 12, wherein the second marker housing 24 is capable of being lockably positioned at any point along the support member 12. A second thumb screw 26 is connected to the second marker housing 24 to lock the second marker housing 24 at a second position along the support member 12. A second retractable pin 28 is positioned in the second marker housing 24, wherein the second retractable pin 28 extends and retracts from the second marker housing 24 to mark a second position on the surface. A second rotatable knob 30 attached to the second marker housing 24 and connected to the second retractable pin 28, wherein the rotation of the second rotatable knob 30 extends and retracts the second retractable pin 28 from the second marker housing 24. A vertical level 32 may be positioned on the first marker housing 14, second marker housing 24 or the support member 12 to vertically align the support member 12. Similarly, a horizontal level 34 may be positioned on the first marker housing 14, second marker housing 24 or the support member 12 to horizontally align the support member 12 and ultimately the frame. The marker housings and any parts thereof can be unitary or made from various parts and can be made from any material, including, but not limited to: plastic, polymer, wood, metal, composites, fiberglass, or combinations thereof, and the marker housings and any parts thereof can be made by, e.g., injection molding, milling, stamping, or even 3-D printed.

Figure 2:
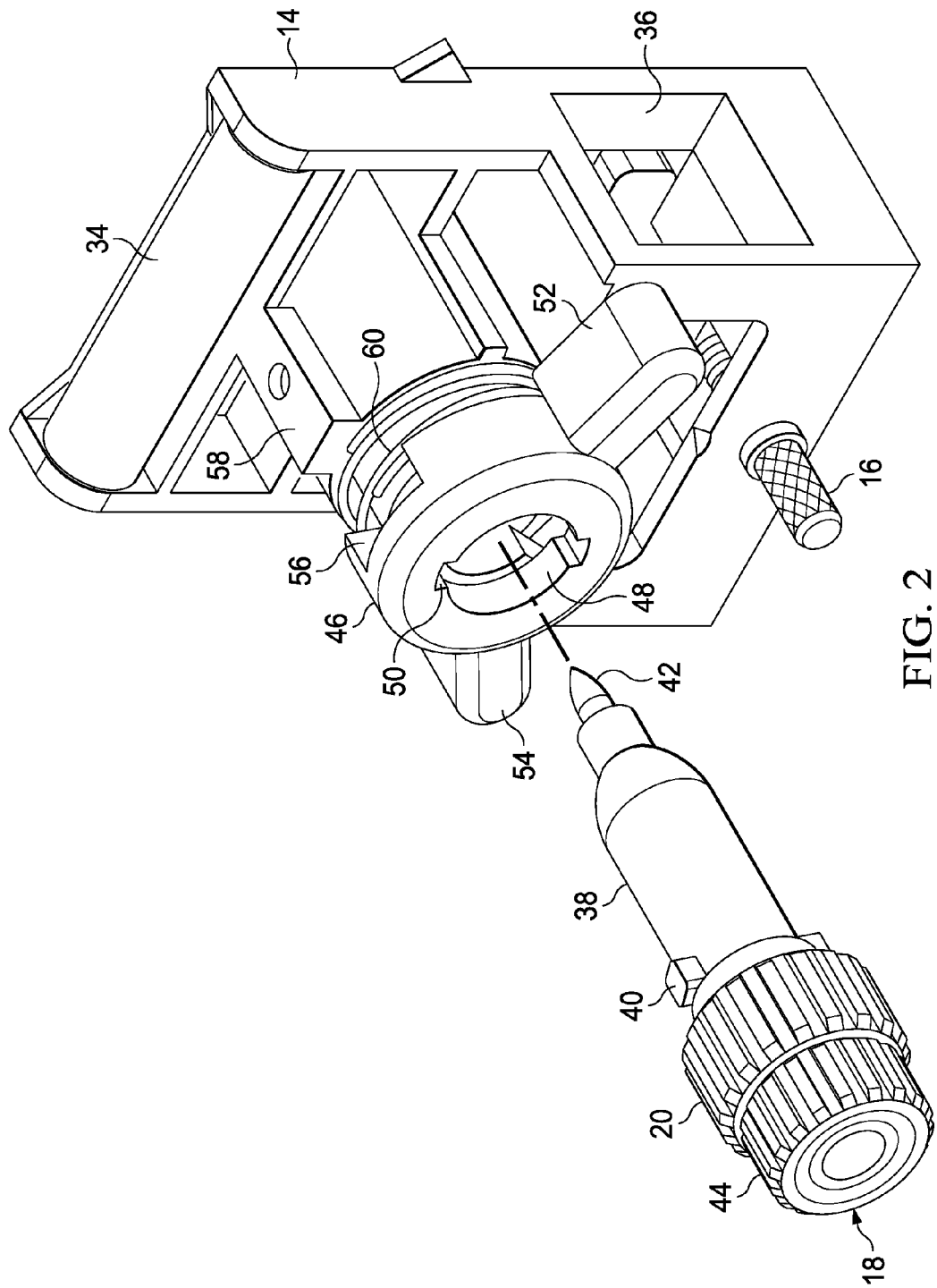
FIG. 2 is an isometric view of one embodiment of the marker housing.

FIG. 2 is an isometric view of one embodiment of the first marker housing 14 or the second marker housing 24. For ease of reference the marker housing will be referenced as the first marker housing 14 but applies to the second marker housing 24 equally. The first marker housing 14 includes a first thumb screw 16 connected to the first marker housing 14 to lock the first marker housing 14 at a first position along the support member 12 (not shown). The first thumb screw 16 tightens the support member aperture 36 to stop the movement of the first marker housing 14 along the support member 12 (not shown). Although the first thumb screw 16 is shown as a thumb screw it may be any configuration that causes a tightening of the support member aperture 36. The first marker housing 14 includes a first retractable pin 18 positioned in the first marker housing 14, wherein the first retractable pin 18 extends and retracts from the first marker housing 14 to mark a first position on a surface. The first retractable pin 18 may be removably poisoned in the first marker housing 14. The first retractable pin 18 includes a shaft 38 connected to an indicator point 42. The shaft 38 includes a locking tab 40 to align and movably fix the first retractable pin 18 in the first marker housing 14. The indicator point 42 may be a pin, nail, sharp surface, pointed surface or similar design to dent, indent, scratch or cut the surface opposite the indicator point 42. Importantly, the first retractable pin 18 can be replaced with a marker, e.g., a permanent marker, a pencil, a marker, a semi-permanent marker, a pen, a felt-tip pen, a gel pen, a brush, or any other type of marker capable of leaving a mark on a surface, which surface can include rough surfaces such as rough wood, cement, concrete, brick, or surfaces that are difficult to mark with a pin, such as metal or glass. In addition, the indicator point 42 may be a pin or pencil that marks the surface. The first marker housing 14 includes a pin housing 46 that has a pin aperture 48 to receive the first retractable pin 18 as shaft 38 enters the pin aperture 48 such that the locking tab 40 aligns with the locking tab slot 50. The first rotatable knob 20 extends and retracts the first retractable pin 18 from the pin housing 46 and can be rotated to lock the first retractable pin 18 in the pin housing 46. The auxiliary rotatable knob 44 may serve a variety of functions including the movement of the indicator point 42 to the surface (not shown) to account for wear. The pin housing 46 is designed to move inwardly and outwardly toward the surface (not shown) to force the indicator point 42 against the surface (not shown). The pin housing 46 includes rotating bars 52 and 54 that can be used to rotate the pin housing 46. The pin housing 46 includes a recess 56 that accommodates the tab 58 on the first marker housing 14 when pressed toward the surface. A spring 60 moves the pin housing 46 back to the starting position. The rotating bars 52 and 54 may be turned to lock the first retractable pin 18 from moving by turning the pin housing 46 so that the tab 58 contacts the pin housing 46 and not the recess 56. While the marker housing is depicted with a support member aperture 36, the skilled artisan will recognize that the aperture may be replaced with a hook, adhesive, hook and look, snap, or other device that would permit the marker housing(s) to attach to a support member, such as a carpenter's ruler.

Figure 3:
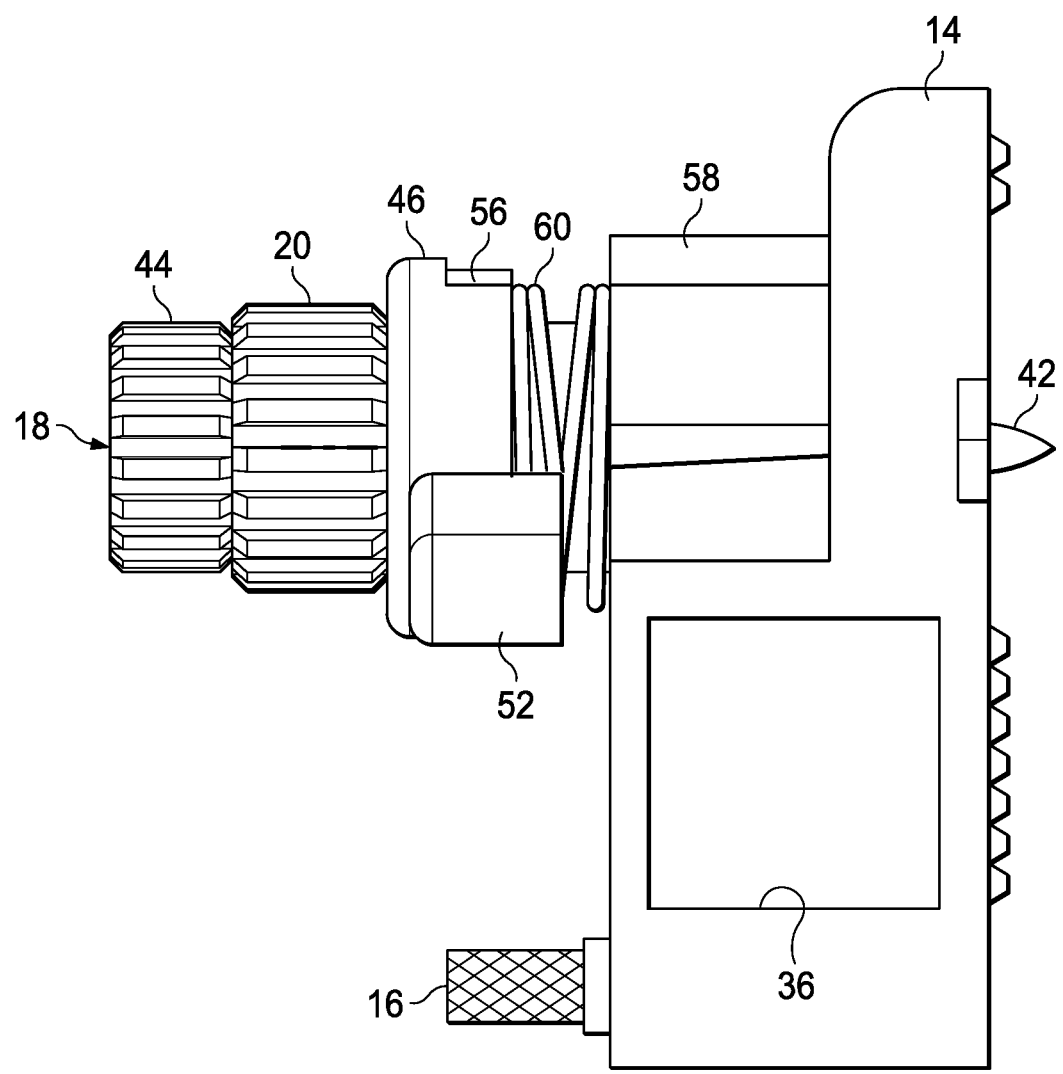
FIG. 3 is a side view of one embodiment of the marker housing.

FIG. 3 is a side view of one embodiment of the first marker housing 14 or the second marker housing 24 (not shown). For ease of reference the marker housing will be referenced as the first marker housing 14 but applies to the second marker housing 24 (not shown) equally. The first marker housing 14 includes a first thumb screw 16 connected to the first marker housing 14 to lock the first marker housing 14 at a first position along the support member (not shown). The first thumb screw 16 tightens the support member aperture 36 to stop the movement of the first marker housing 14 along the support member (not shown). Although the first thumb screw 16 is shown as a thumb screw it may be any configuration that causes a tightening of the support member aperture 36. The first marker housing 14 includes a first retractable pin 18 positioned in the first marker housing 14, wherein the first retractable pin 18 extends and retracts from the first marker housing 14 to mark a first position on a surface (now shown). The first retractable pin 18 may be removably poisoned in the first marker housing 14. The first retractable pin 18 includes a shaft (not shown) connected to an indicator point 42. The shaft (not shown) includes a locking tab (not shown) to align and movably fix the first retractable pin 18 in the first marker housing 14. The indicator point 42 may be a pin, nail, sharp surface, pointed surface or similar design to dent, indent, scratch or cut the surface opposite the indicator point 42. In addition, the indicator point 42 may be a pin or pencil that marks the surface (not shown). The first marker housing 14 includes a pin housing 46 that has a pin aperture (not shown) to receive the first retractable pin 18. Importantly, the first retractable pin 18 can be replaced with a marker, e.g., a permanent marker, a pencil, a marker, a semi-permanent marker, a pen, a felt-tip pen, a gel pen, a brush, or any other type of marker capable of leaving a mark on a surface, which surface can include rough surfaces such as rough wood, cement, concrete, brick, or surfaces that are difficult to mark with a pin, such as metal or glass. The first rotatable knob 20 extends and retracts the first retractable pin 18 from the pin housing 46 and can be rotated to lock the first retractable pin 18 in the pin housing 46. The auxiliary rotatable knob 44 may serve a variety of functions including the movement of the indicator point 42 to the surface to account for wear. The pin housing 46 is designed to move inwardly and outwardly toward the surface (not shown) to force the indicator point 42 against the surface (not shown). The pin housing 46 includes rotating bar 52 that can be used to rotate the pin housing 46. The pin housing 46 includes a recess 56 that accommodates the tab 58 on the first marker housing 14 when pressed toward the surface (not shown). A spring 60 moves the pin housing 46 back to the starting position. The rotating bar 52 may be turned to lock the first retractable pin 18 from moving by turning the pin housing 46 so that the tab 58 contacts the pin housing 46 and not the recess 56.

Figure 4:
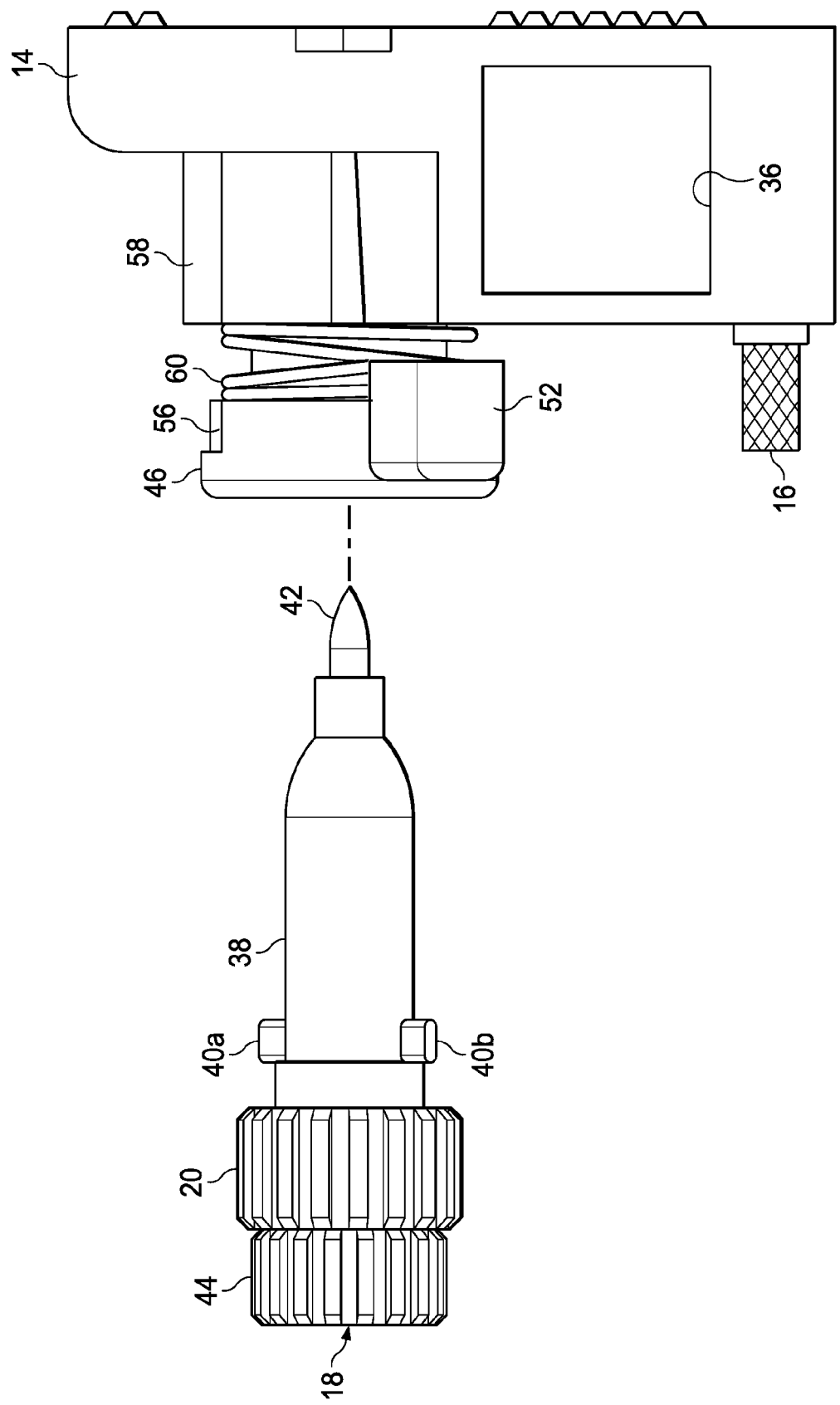
FIG. 4 is a side view of one embodiment of the marker housing with the retractable pin shown.

FIG. 4 is a side view of one embodiment of the marker housing with the retractable pin removed. For ease of reference the marker housing will be referenced as the first marker housing 14 but applies to the second marker housing 24 equally. The first marker housing 14 includes a first thumb screw 16 connected to the first marker housing 14 to lock the first marker housing 14 at a first position along the support member (not shown). The first thumb screw 16 tightens the support member aperture 36 to stop the movement of the first marker housing 14 along the support member (not shown). Although the first thumb screw 16 is shown as a thumb screw it may be any configuration that causes a tightening of the support member aperture 36. The first marker housing 14 includes a first retractable pin 18 positioned in the first marker housing 14, wherein the first retractable pin 18 extends and retracts from the first marker housing 14 to mark a first position on a surface. The first retractable pin 18 may be removably poisoned in the first marker housing 14. The first retractable pin 18 includes a shaft 38 connected to an indicator point 42. The shaft 38 includes a locking tabs 40a and 40b to align and movable fix the first retractable pin 18 in the first marker housing 14. The indicator point 42 may be a pin, nail, sharp surface, pointed surface or similar design to dent, indent, scratch or cut the surface opposite the indicator point 42. In addition, the indicator point 42 may be a pin or pencil that marks the surface. The first marker housing 14 includes a pin housing 46 that has a pin aperture (not shown) to receive the first retractable pin 18. The first rotatable knob 20 extends and retracts the first retractable pin 18 from the pin housing 46 and can be rotated to lock the first retractable pin 18 in the pin housing 46. The auxiliary rotatable knob 44 may serve a variety of functions including the movement of the indicator point 42 to the surface to account for wear. The pin housing 46 is designed to move inwardly and outwardly toward the surface (not shown) to force the indicator point 42 against the surface (not shown). The pin housing 46 includes rotating bar 52 that can be used to rotate the pin housing 46. The pin housing 46 includes a recess 56 that accommodates the tab 58 on the first marker housing 14 when pressed toward the surface (not shown). A spring 60 moves the pin housing 46 back to the starting position. The rotating bar 52 may be turned to lock the first retractable pin 18 from moving by turning the pin housing 46 so that the tab 58 contacts the pin housing 46 and not the recess 56.

Figure 5:
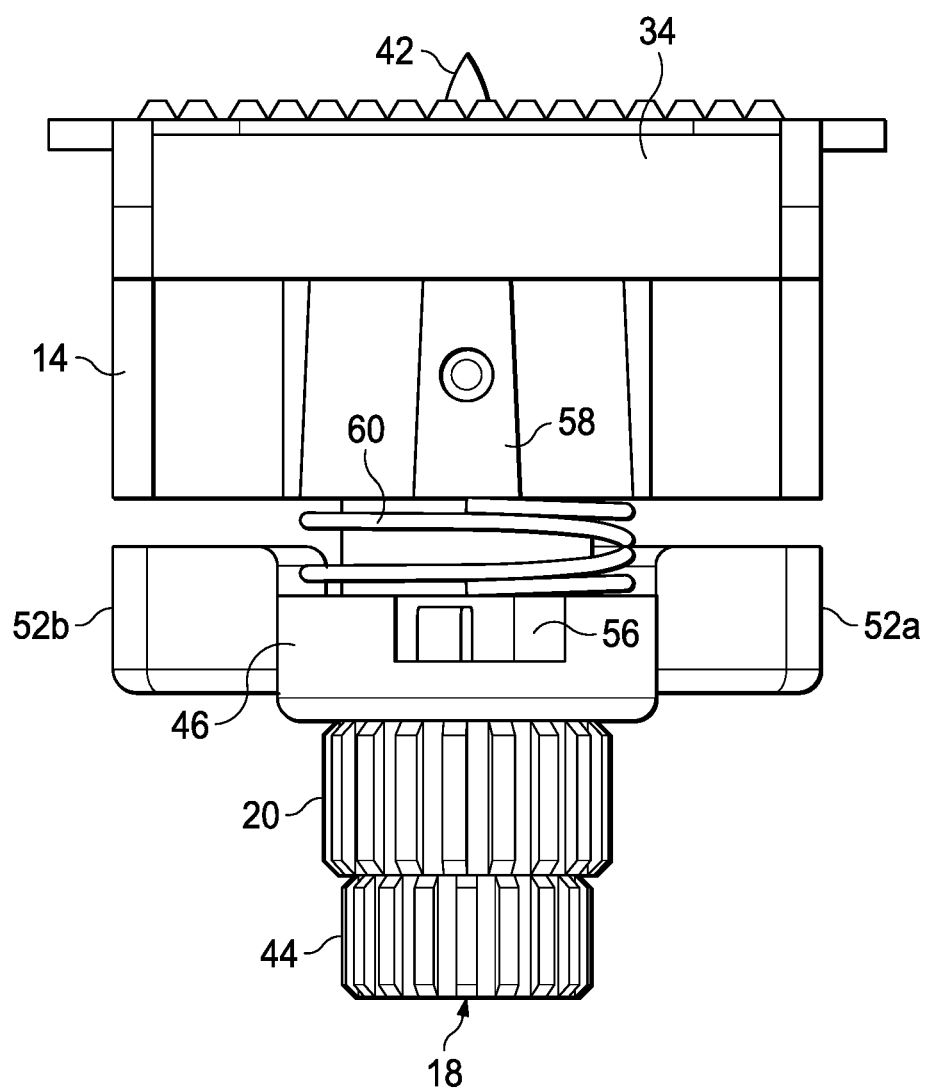
FIG. 5 is a top view of one embodiment of the first marker housing or the second marker housing.

FIG. 5 is a top view of one embodiment of the first marker housing 14 or the second marker housing 24. For ease of reference the marker housing will be referenced as the first marker housing 14 but applies to the second marker housing 24 equally. The first marker housing 14 includes a first thumb screw 16 (not shown) connected to the first marker housing 14 to lock the first marker housing 14 at a first position along the support member (not shown). The first thumb screw, 16 (not shown) tightens the support member aperture 36 (not shown) to stop the movement of the first marker housing 14 along the support member aperture 36 (not shown). Although the first thumb screw 16 (not shown) is shown as a thumb screw it may be any configuration that causes a tightening of the support member aperture 36 (not shown). The first marker housing 14 includes a first retractable pin 18 positioned in the first marker housing 14, wherein the first retractable pin 18 extends and retracts from the first marker housing 14 to mark a first position on a surface. The first retractable pin 18 may be removably poisoned in the first marker housing 14. The first retractable pin 18 includes a shaft 38 (not shown) connected to an indicator point 42. The shaft 38 (not shown) includes a locking tab 40 (not shown) to align and movably fix the first retractable pin 18 in the first marker housing 14. The indicator point 42 may be a pin, nail, sharp surface, pointed surface or similar design to dent, indent, scratch or cut the surface opposite the indicator point 42. In addition, the indicator point 42 may be a pin or pencil that marks the surface. The first marker housing 14 includes a pin housing 46 that has a pin aperture 48 (not shown) to receive the first retractable pin 18. The first rotatable knob 20 extends and retracts the first retractable pin 18 from the pin housing 46 and can be rotated to lock the first retractable pin 18 in the pin housing 46. The auxiliary rotatable knob 44 may serve a variety of functions including the movement of the indicator point 42 to the surface to account for wear. The pin housing 46 is designed to move inwardly and outwardly toward the surface (not shown) to force the indicator point 42 against the surface (not shown). The pin housing 46 includes rotating bar 52 that can be used to rotate the pin housing 46. The pin housing 46 includes a recess 56 that accommodates the tab 58 on the first marker housing 14 when pressed toward the surface (not shown). A spring 60 moves the pin housing 46 back to the starting position. The rotating bar 52 may be turned to lock the first retractable pin 18 from moving by turning the pin housing 46, so that the tab 58 contacts the pin housing 46 and not the recess 56. A horizontal level 34 may be positioned on the first marker housing 14 to horizontally align the support member 12 (not shown) and ultimately the frame 62 (not shown).

Figure 6:
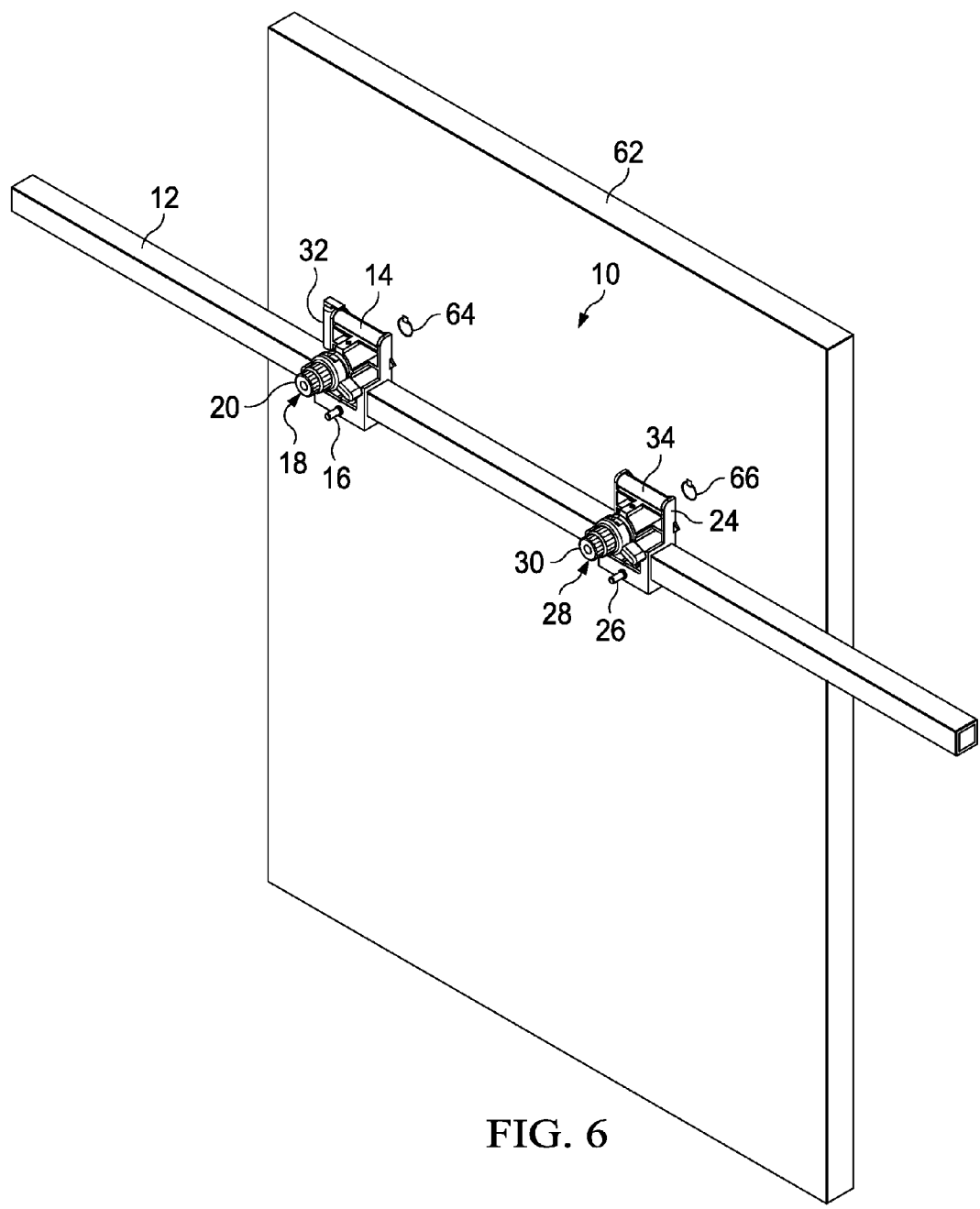
FIG. 6 is an isometric view of one embodiment of the picture hanging marking tool measuring a frame having a first attachment ring and a second attachment ring.

FIG. 6 is an isometric view of one embodiment of the picture hanging marking tool 10 measuring a frame 62 having a first attachment ring 64 and a second attachment ring 66. The picture hanging marking tool 10 includes a support member 12. A first marker housing 14 is slid into positioned on the support member 12 to align the first retractable pin 18 with the first attachment ring 64. The first marker housing 14 is then locked into position along the support member 12 by tightening a first thumb screw 16 connected to the first marker housing 14. The first marker housing 14 includes a first retractable pin 18 positioned in the first marker housing 14, wherein the first retractable pin 18 extends and retracts from the first marker housing 14 to mark a first position on a surface. The first marker housing 14 includes a first rotatable knob 20 attached to the first marker housing 14 and connected to the first retractable pin 18, wherein the rotation of the first rotatable knob 20 extends and retracts the first retractable pin 18 from the first marker housing 14. The second marker housing 24 is slid into position on the support member 12 to align with the second attachment ring 66. A second thumb screw 26 is connected to the second marker housing 24 and rotated to lock the second marker housing 24 in position along the support member 12. A second retractable pin 28 is positioned in the second marker housing 24, wherein the second retractable pin extends and retracts from the second marker housing 24 to mark a second position on the surface. A second rotatable knob 30 attached to the second marker housing 24 and connected to the second retractable pin 28, wherein the rotation of the second rotatable knob 30 extends and retracts the second retractable pin 28 from the second marker housing 24. A vertical level 32 may be positioned on the first marker housing 14, second marker housing 24 or the support member 12 to vertically align the support member 12. Similarly, a horizontal level 34 may be positioned on the first marker housing 14, second marker housing 24 or the support member 12 to horizontally align the support member 12 and ultimately the frame 62. The support member 12 has the first marker housing 14 aligned with the first attachment ring 64 and locked into position and has the second marker housing 24 aligned with the second attachment ring 66 and locked into position. The relationship between the first attachment ring 64 and the second attachment ring 66 can now be transferred to a wall or other surface. The picture hanging marking tool 10 is placed on the surface and leveled using the vertical level 32 and horizontal level 34. Once level, and at the desired location, the first retractable pin 18 and the second retractable pin 28 can be pressed to mark a first location (not shown) and a second location (not shown) on the surface. A metal rod, a pin, a nail, a hook an hanger or any mechanism that is capable of being inserted into the surface (not shown) and supporting the frame 62 can then be inserted into the first location (not shown) and a second location (not shown) to receive the first attachment ring 64 and second attachment ring 66 of the frame 62.

While the support member 12 is shown as a square tube, the skilled artisan will recognize that any profile shape (e.g., rectangular, round, oval, triangular, polygonal, tubular, angled, etc.) may be used as the support member 12 needs only to be long and straight enough to reach the attachment points of the frame 62. In addition, the support member 12 may be malleable and bendable to accommodate any mounting position. Further, additional support members may be used to provide, e.g., parallel, diagonal, perpendicular, or other positioning of a second device that can be attached or used in conjunction with the present invention, such as a square, speed-square, triangle, framing square, combination square, try square, sheetrock square, a protractor, etc.

In another embodiment the picture hanging marking tool 10 includes marker housings without a retractable pin such that a marker (sharpie, marker, pen, pencil, crayon, nail, punch, drill bit, stake or any other object that can mark or penetrate the surface). One important aspect of the present invention is that it permits the marking of surfaces that are difficult, impossible, or that the user would not want to dent, indent, scratch or cut, or otherwise use a pin or other mechanical device to mark. Thus, the user would use the pins to determine the locations of the holes on the frame along the length of the support member. Once the distance is set and the marker housings are locked in place, the pins are easily removed from the one or more marker housings, and upon placing the device in the desired location and the device leveled, the opening that once help the pin serves to guide for a marker or other device that leaves an indicia (such as ink, paint, pencil, carbon, etc.), such that a mark is placed at the precise location for the final mounting position at the one or more marker housings. This provides, for the first time, a completely flexible way to select the manner in which the indicia is placed on a wide variety of surfaces using a single device.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A mounting hole transfer device comprising:
   a support member; and
   one or more marker housings slidably positioned on the support member, wherein the one or more marker housings are capable of being lockably positioned at any point along the support member and comprise an opening to transfer an indicia onto a surface, and at least one horizontal level on at least one of the support member or the one or more marker housings to leveling the mounting hole transfer device.

2. The device of claim 1, wherein the support member comprises a profile comprising a square profile, a member having a rectangular profile, a member having a circular profile, a member having a polygonal profile, a member having a triangular profile, or a member having an "L"-shaped profile.

3. The device of claim 1, wherein at least one of the support member or the one or more marker housings comprises metal (aluminum, steel, alloys), wood, plastic, polymer, composite, ceramic, fiberglass, or combinations thereof.

4. The device of claim 1, wherein the support member comprises one or more indicia or indentations comprising one or more units of measure, which units may begin at first end, at a center-point, a second end, the indicia may increase numerically from right to left, the indicia may increase from left to right, the indicia may increase from the center outward, or have an intermediate starting point.

5. A method of mounting a frame on a wall comprising the steps of:
   aligning one or more mounting points of one or more marker housings slidably positioned on a support member, wherein the one or more marker housings are capable of being lockably positioned at any point along the support member and on a mounting position of a frame, wherein each of the one or more marker housings comprising one or more levels;
   locking the one or more marker housings on the support member;
   positioning the mounting hole transfer device on the wall;
   leveling the support member and the one or more marker housings on the wall; and
   marking a surface of the wall with a marker.

6. A mounting hole transfer device kit comprising:
   an instruction set to aid in assembly;
   one or more marker housings capable of being slidably positioned on a support member, wherein the first marker housing is capable of being positioned at any point along the support member, and comprising:
   a first locking device connected to the first marker housing to restrict the movement of the first marker housing along the support member;
   a first retractable pin positioned in the first marker housing, wherein the first retractable pin extends and retracts from the first marker housing;
   a first pin actuator positioned in the first marker housing and contacting the first retractable pin to extend and retract the first retractable pin from the first marker housing or alternatively removing the first retractable pin to provide an opening for a marker; and
   a horizontal level positioned on the one or more marker housings to horizontally align the support member; and
   optionally a vertical level positioned on the one or more marker housings to vertically align the support member.

7. A frame hanging marker housing comprising:
   a marker housing capable of being slidably positioned on a support member, wherein the marker housing is capable of being lockably positioned at any point along the support member;

a marking aperture positioned in the marker housing, wherein the marking aperture extends to mark a position on a surface, and an optional vertical level positioned on the marker housing, a horizontal level positioned on the marker housing or both.

8. A mounting hole transfer device comprising:

a support member;

a first marker housing slidably positioned on the support member, wherein the first marker housing is capable of being lockably positioned at any point along the support member, comprising:

a first thumb screw connected to the first marker housing to lock the first marker housing at a first position along the support member, a first retractable pin positioned in the first marker housing, wherein the first retractable pin extends and retracts from the first marker housing to mark a first position on a surface, and a first rotatable knob attached to the first marker housing and connected to the first retractable pin, wherein the rotation of the first rotatable knob extends and retracts the first retractable pin from the first marker housing;

an optional second marker housing slidably positioned on the support member, wherein the second marker housing is capable of being lockably positioned at any point along the support member, comprising:

a second thumb screw connected to the second marker housing to lock the second marker housing at a second position along the support member, a second retractable pin positioned in the second marker housing, wherein the second retractable pin extends and retracts from the second marker housing to mark a second position on the surface, and a second rotatable knob attached to the second marker housing and connected to the second retractable pin, wherein the rotation of the second rotatable knob extends and retracts the second retractable pin from the second marker housing;

a horizontal level positioned on the first marker housing, second marker housing or the support member to horizontally align the support member; and an optional vertical level positioned on the first marker housing, second marker housing or the support member to vertically align the support member.

9. The device of claim 8, wherein the support member comprises a profile comprising a square profile, a member having a rectangular profile, a member having a circular profile, a member having a polygonal profile, a member having a triangular profile, or a member having an "L"-shaped profile.

10. The device of claim 8, wherein the first locking device, the second locking device, or both comprises a fastener, a latch, a spring, a thumb screw, a clip, a rail clip, a clutch, or lever that tightens a tab against the support member.

11. The device of claim 8, wherein the first locking device, the second locking device, or both comprise a vice like mechanism that tightens the first locking device to the support member.

12. The device of claim 8, wherein the first locking device, the second locking device, or both comprises a first knob that tightens a tab against the support member.

13. The device of claim 8, wherein the first locking device, the second locking device, or both comprises a first lever that tightens a tab against the support member.

14. The device of claim 8, wherein the first retractable pin, the second retractable pin, or both comprise a metal rod, a pin, a pencil, a nail or any mechanism that is capable of marking, indenting, cutting, or scratching a surface.

15. The device of claim 8, wherein the first retractable pin, the second retractable pin, or both are replaceable.

16. The device of claim 8, wherein the first pin actuator, the second actuator, or both comprise a plunger, a knob, or a tab that presses the first retractable pin, the second retractable pin, or both into the surface.

17. The device of claim 8, wherein the vertical level, horizontal level, or both are a bubble, a bull's eye, a laser, a plumb-bob, or a spirit level.

18. The device of claim 8, wherein the first retractable pin, the second retractable pin, or both are removed, leaving an opening for a marker.

19. The device of claim 8, wherein the support member comprises metal (aluminum, steel, alloys), wood, plastic, polymer, composite, fiberglass, or combinations thereof.

20. The device of claim 8, wherein the support member comprises one or more indicia or indentations comprising one or more units of measure, which units may begin at first end, at a center-point, a second end, the indicia may increase numerically from right to left, the indicia may increase from left to right, the indicia may increase from the center outward, or have an intermediate starting point.

21. A method of marking a location to mount a frame on a wall or surface comprising the steps of:

providing a frame having a first mounting point and a second mounting point;

providing a mounting hole transfer device comprising:

a support member; a first marker housing slidably positioned on the support member, wherein the first marker housing is capable of being lockably positioned at any point along the support member, a first thumb screw connected to the first marker housing to lock the first marker housing at a first position along the support member, a first retractable pin positioned in the first marker housing, wherein the first retractable pin extends and retracts from the first marker housing to mark a first position on a wall, and a first rotatable knob attached to the first marker housing and connected to the first retractable pin, and wherein the rotation of the first rotatable knob extends and retracts the first retractable pin from the first marker housing;

a second marker housing slidably positioned on the support member, wherein the second marker housing is capable of being lockably positioned at any point along the support member, a second thumb screw connected to the second marker housing to lock the second marker housing at a second position along the support member, a second retractable pin positioned in the second marker housing, wherein the second retractable pin extends and retracts from the second marker housing to mark a second position on the wall, and a second rotatable knob attached to the second marker housing and connected to the second retractable pin, wherein the rotation of the second rotatable knob extends and retracts the second retractable pin from the second marker housing; an optional vertical level positioned on the first marker housing, second marker housing or the support member to vertically align the support member; and a horizontal level positioned on the first marker housing, second marker housing or the support member to horizontally align the support member;

positioning the mounting hole transfer device on the frame;

aligning the first mounting point with the first retractable pin;
tightening the first thumb screw to lock the first marker housing on the support member;
positioning the second marker housing on the support member to align the second retractable pin with the second mounting point;
tightening the second thumb screw to lock the second marker housing on the support member;
removing the mounting hole transfer device;
positioning the mounting hole transfer device on the wall;
aligning the horizontal level to horizontally align the support member on the wall;
aligning the horizontal level to vertically align the support member on the wall;
turning the first rotatable knob to extend the first retractable pin from the first marker housing into the wall to form a first mounting mark or removing the first mounting point to provide an opening for a marker;
turning the second rotatable knob to extend the second retractable pin from the second marker housing into the wall to form a second mounting mark or removing the second mounting point to provide an opening for a marker; and
marking the location to mount a frame on the wall.

22. The method of claim 21, further comprising the steps of:
removing the mounting hole transfer device from the wall;
inserting a first fastener into the wall at the first mounting mark;
inserting a second fastener into the wall at the second mounting mark;
positioning the frame to align the first mounting point with the first fastener and the second mounting point with the second fastener.

23. The method of claim 21, wherein the support member comprises a profile comprising a square profile, a member having a rectangular profile, a member having a circular profile, a member having a polygonal profile, a member having a triangular profile, or a member having an "L" shaped profile.

24. The method of claim 21, wherein the first retractable pin, the second retractable pin, or both comprise a metal rod, a pin, a pencil, a nail or any mechanism that is capable of marking on a surface.

25. The method of claim 21, wherein the first retractable pin, the second retractable pin, or both are retractable.

26. The method of claim 21, wherein the vertical level, horizontal level, or both are a bubble, a bull's eye, a laser, a plumb-bob, or a spirit level.

* * * * *